United States Patent [19]

Diazzi

[11] 4,432,127
[45] Feb. 21, 1984

[54] PROCESS OF MOLDING AND ASSEMBLING A PAIR OF HANDLES OF A PLASTIC BAG

[76] Inventor: Mauro Diazzi, Via Chiesa Sud, 243/A-Rovereto sul Secchia, Italy

[21] Appl. No.: 356,107

[22] Filed: Mar. 8, 1982

[51] Int. Cl.³ .................... B28B 7/10; B29C 27/00
[52] U.S. Cl. .................................. 29/436; 29/453;
 264/242; 264/318; 264/328.8; 264/334;
 264/DIG. 76; 425/441; 425/444; 425/556;
 425/577; 425/588
[58] Field of Search ............... 425/556, DIG. 58, 441,
 425/444, 467, 577, 588; 264/334, 242, 250, 297,
 299, 318, 328.8, DIG. 76; 29/436, 453

[56] References Cited

U.S. PATENT DOCUMENTS

| | | | |
|---|---|---|---|
| 2,724,867 | 11/1955 | Smith | 425/DIG. 3 |
| 3,069,105 | 12/1962 | Press et al. | 425/DIG. 3 |
| 3,477,095 | 11/1969 | Lensky | 425/438 X |
| 3,861,840 | 1/1975 | Heisler | 249/58 X |
| 4,125,246 | 11/1978 | von Holdt | 249/58 |
| 4,209,485 | 6/1980 | Greenspan | 264/334 X |

Primary Examiner—Jay H. Woo
Assistant Examiner—James C. Housel
Attorney, Agent, or Firm—Newton, Hopkins & Ormsby

[57] ABSTRACT

A process and a molding unit for the automatic molding, expelling and assembling to one another of at least a pair of plastic handles for a plastic bag, consisting of a male and female handles (A and B) and provided with snap fastening means for closing said bag, characterized by the use of a molding unit comprising:
  two mold blocks, each having a cavity for removably receiving a mold, respectively said cavities and the molds forming two juxtaposed molding chambers, separated from one another by slidable wall members constituting in combination the countermolds of the two respective molding chambers in operative position thereof,
  means for moving the mold blocks together with the molds to and from one another,
  means for slidably moving said slidable wall to and from its closing position,
  injection means for feeding molded plastic material into both molding chambers shaped to form a female and a male handles (A and B),
  punch means to form in each male handle (A) each pin of the snap fastening means as well as the respective pin receiving holes, and
  stripping means for the expulsion from said molding chambers and mutual assembling of each pair of the male and female handles (A and B) to one another.

3 Claims, 8 Drawing Figures

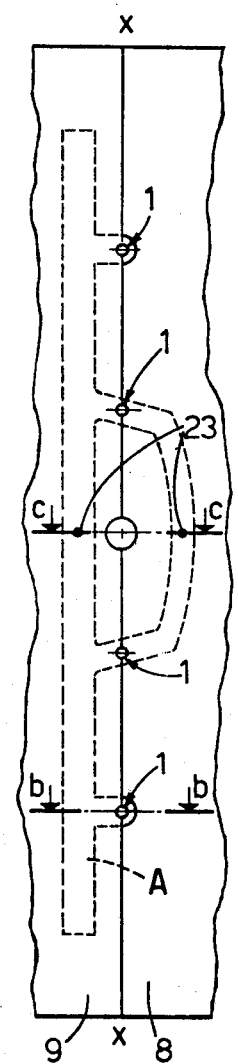
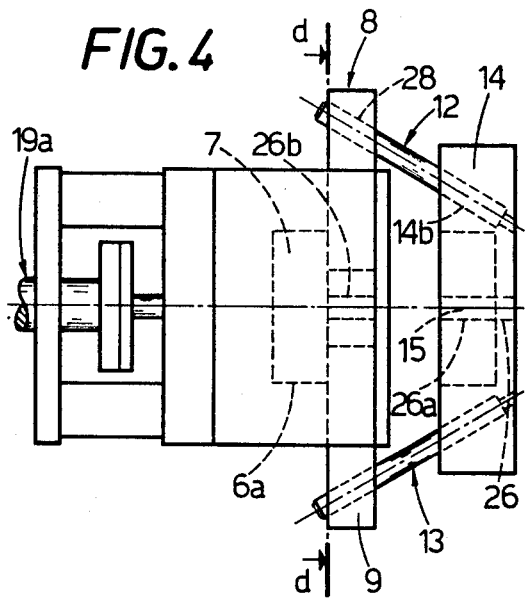
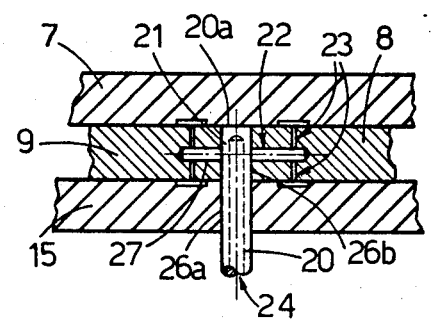

PROCESS OF MOLDING AND ASSEMBLING A PAIR OF HANDLES OF A PLASTIC BAG

The present invention relates to a process and a molding unit for the automatic molding and the simultaneous expelling and mutually assembling of the male and female handles of at least a pair of handles made of plastics, preferably polyethylene, which have to be welded to a plastic bag of the type, which housewives use to go shopping. In particular, the present invention provides a process and a molding unit for automatically performing the molding, the expulsion and the assembly of the two co-operating handles of at least a pair of handles for a plastic bag, which are simultaneously molded into said molding unit.

Said plastic bags are well known in the art as well as the characteristics of their plastic handles which are provided with snap fastening means consisting of pins and pin receiving holes designed to co-operate with one another for closing the bag in an openable manner, by means of a pressure and a perking action respectively. The designs of said handles can be varied.

Heretofore this process has been performed according to the following operative sequence:

(a) the molding in separated molds or in a single mold of one or more male and female handles;
 (b) the manual separation from the injection sinkheads and from their molds of the obtained plastic handles;
 (c) the manual connection in pairs of the male and females to one another, causing the penetration of each pin through the respective pin receiving hole of the snap fastening means. This operation is necessary, since the bag body will be then welded to the respective pair of handles in the mutual assembled and locked position thereof.

On the contrary, the present invention aims to provide a process according to which one or more plastic male and female handles for plastic bags can be molded in pairs and can be expelled and simultaneously assembled to one another, ready to be welded to a plastic bag, according to an operative entirely automatic sequence and without the intervention of any operator.

Other characteristics and advantages of the present invention will be better understood in the course of the following description of a preferred embodiment of the invention, given merely by way of illustrative example and taken in consideration together with the following drawings, in which:

FIGS. 3 and 4 show diagrammatically the front view and the top view respectively of the molding unit;

FIG. 5 shows diagramatically and in enlarged scale a detail of the cross section taken on the line d—d of FIG. 4 in closed position of the slidable wall members forming the countermolds of each pair of molding chambers of the molding unit;

FIG. 9 show a detail of the cross section taken on the line c—c of FIG. 5.

Figure 1:
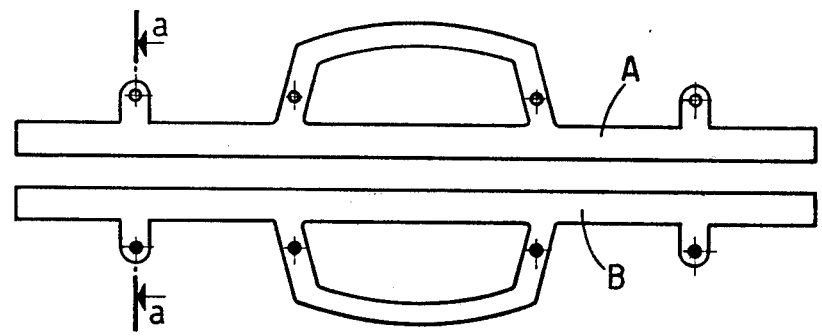
FIGS. 1 and 2 show a plan view and the cross section taken on the line a—a of FIG. 1 of a pair of conventional male and female handles for a bag.
Figure 2:
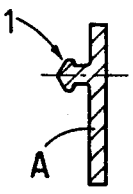
Figure 3:
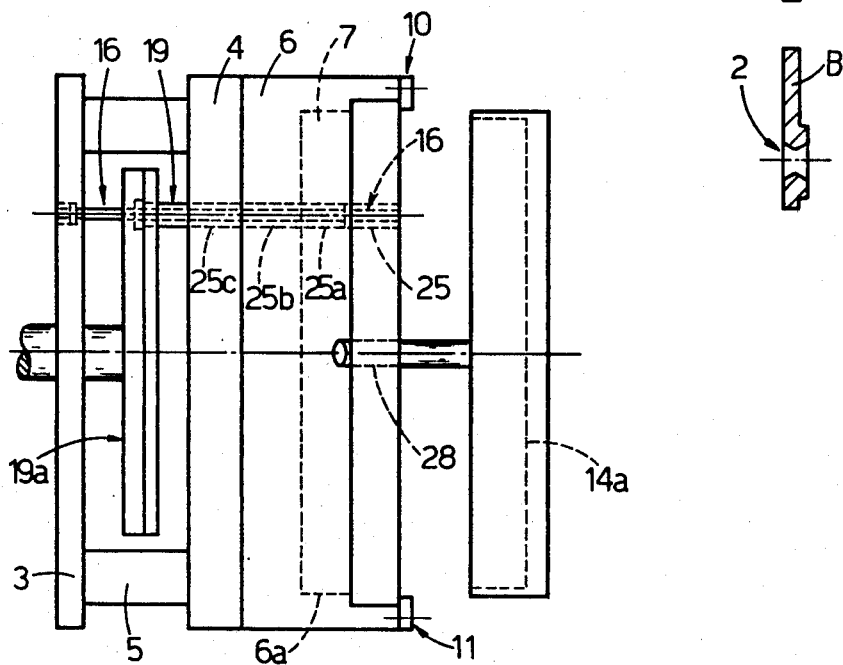

Now referring to the drawings, 3 is a plate to be securely fixed to one of the press members of a molding press, not shown in the drawings. The plate 3 is made integral with another parallel plate 4 by means of spacing bars 5. A first mold supporting block 6 is fixed to the plate 4 and is so shaped to form an open cavity 6a to receive a mold plate 7, on the outer surface of which is engraved the profile of the outer surface of the female handle B of a handle pair A and B. The mold plate 7 is connected to the block 6 so as to be easily removed and replaced by another mold plate carrying a different profile so as to enable to obtain handles of different designs.

In the mold block 6 seats are also provided to receive two sliding wall members 8 and 9, associated with means adapted to move said wall members 8 and 9 to and from one another, as the two wings of a sliding door. The wall members 8 and 9 are retained and guided by longitudinal stringers 10 and 11 extending one towards the other. The means for causing the reciprocating movements of the wall members 8 and 9 in unison with the reciprocating movements of the two press members (not shown) consists of a pair of horizontal rods 12 and 13 inclined outwardly and fixed to a second mold block 14 designed to be connected to the second of the press members, extending towards the molding chamber of the first mold block 6 and slidably passing through inclined holes 28 provided in the block 14. In the second block 14 is provided a cavity 14a facing the cavity 6a and designed to removably receive a mold plate 15, on the outer surface of which is engraved the profile of the outer surface of the handle A. On the respective main surfaces of the wall members 8 and 9 are engraved profiles adapted to form the respective inner profiles of the handles B and A, when the wall members 8 and 9 are held with force in their contact positions (FIG. 5), so that said wall members 8 and 9, in their closure position, constitute the closure means of the two juxtaposed molding chambers and act also as countermolds for the mold 7 and 15, respectively.

As a result of this special structure of the molding unit when the press members, as well as the blocks 6 and 14, together with the molds 7 and 15 are caused to move to and from each other, the sliding wall members 8 and 9 are caused to approach, or move away from one another so as to close or open respectively the or each pair of molding chambers.

When the wall members 8 and 9 are in their closure position, they contact one another along a plane x—x passing through the axis of the pins 1 and of the pin receiving holes 2 co-operating therewith of the snap fastening means and are maintained under pressure in this closure position.

The outer profiles of the handles A and B on the molds 7 and 15 always remain faced to one another in perfect register and therefore as the wall member 8 and 9 are in their contact position two molding chambers are formed with their profiles of the inner sides of the handle pairs in correct register with those engraved on the molds 7 and 15.

Now, other characteristics of the molding unit of the invention will be illustrated, with reference in particular to FIGS. 5 to 8.

In those zones where the pins 1 and the pin receiving holes 2 have to be obtained sets of coaxial holes 25, 25b, are arranged respectively through the plate 7, block 6 and the plate 4 as well as coaxial holes 25c, in the end portion of the wall members 8 and 9. Each set of holes 25, 25a, 25b, 25c is designed to receive a coaxial tubular stripper 19 connected to a common stripper control 19a.

Figure 6:
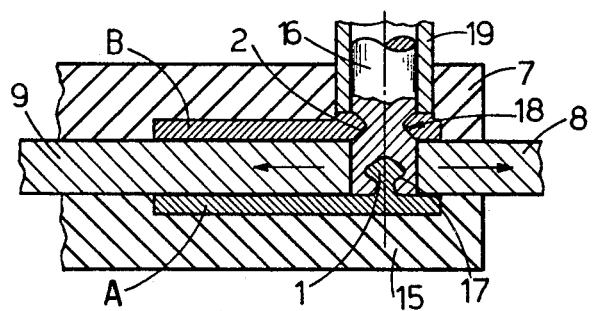
FIGS. 6 to 8 show a detail of the cross section b—b of FIG. 5 in three successive positions of the cooperating parts of the molding unit.
Figure 7:
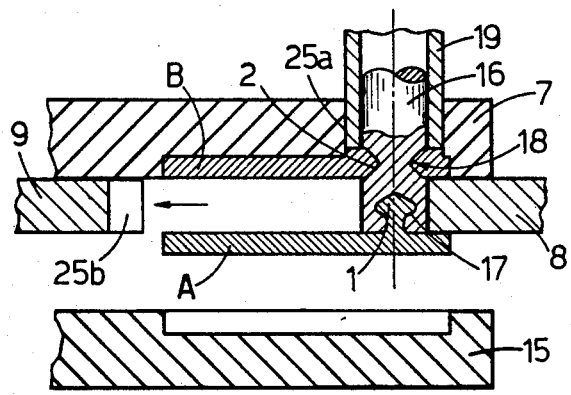
Figure 8:
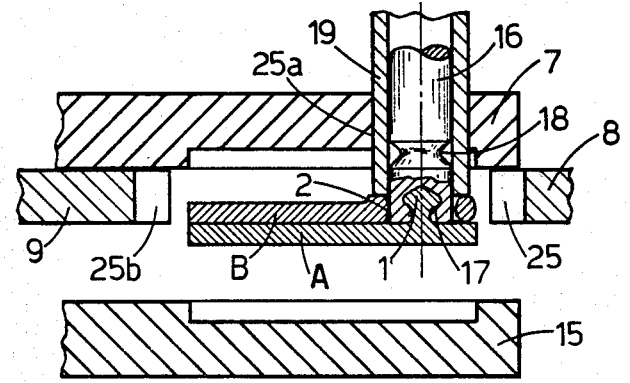

Inside each tubular stripper 19 a punch 16 can slide up and down which is fixedly connected, at its outer end, to the plate 3, while its other end comprises a central recess 17 adapted to form a pin 1 in the male handle A, and an annular groove 18, spaced apart from this inner end, of such an extent to form the respective pin receiving hole 2 in the female handle B, as the molding unit is in its operative position, in which the stripper end edge positioned just-over the annular groove 18 serves to form an annular portion of the outer side of the handle B just about the hole 2. The injection of the plastic material (FIG. 9) is carried out through a tubular injection nozzle 20 passing through a hole 26 (FIG. 4) arranged in the plate 15, a coaxial hole 26a provided through the block 14, and two half-holes 26b provided at the facing edges of the wall members 8 and 9, said holes 26 to 26b having an axis positioned in the plane x—x and perpendicular to the wall members 7 and 8. The nozzle 20 has a closed end 20a designed to come in contact with the outer surfaces of the mold plate 7. Near the closed end 20a of the nozzle 20 radial holes 21 are provided in the nozzle 20 to which short small tubes 22 are connected, which are designed to enter short holes 27 arranged in aligned positions in the facing edges of the wall members 8 and 9, said holes 27 communicating with pairs of transverse holes 23 which open in both the shaping surfaces of the wall members 8 and 9. Of course, the injection must take place only when the slidable wall members 8 and 9 are in mutual contact (FIGS. 5, 6 and 9).

After the injection of the molded plastic material through the nozzle hole 24 and the tubes 22 and holes 23 has been completed and the plastic material has been duly hardened, the molding unit can be opened. For such a purpose the press members together with the mold block 6 and 14 carrying the molds 7 and 15 are moved away from each other separating the or each male handle A from the respective molding chambers. As a result of this movement also the wall members 8 and 9 are caused to move away from one another, owing to the presence of the inclined guiding bars 12 and 13. Then all the strippers 19 are caused to advance towards the handles A now suspended on the punches 16 by their pins 1 engaged into the seats 17 of the punches 16. As each stripper 19 advances inside the molding chamber in which the handle B has been formed, it causes said handle B to come out from its molding chamber and the pin receiving hole 2 to be disengaged from the groove 18. At the same time each punch 16 will be raised by a common punch control and, as a result thereof, the pin 1 comes out of the pin seat 17 and snap enters into the respective pin receiving hole 2 obtained in the handle B. In such a manner each pair of handles A and B are extracted from their molding chambers and are assembled with one another. Said assembled handles A and B then fall out of the molding unit; thus a successive molding cycle can be carried out.

In this description neither the structure of the other components of the molding unit, nor the system for the heating and cooling of the mold sinkheads have been described or illustrated since they are well known in the art.

Of course, the shapes, forms and sizes of the components of the molding unit can be varied without departing from scope of the present invention.

I claim:

1. A method for automatically molding, assembling and expelling two separate plastic handles provided with snap interlockable male and female fastener means respectively on facing surfaces thereof adapted to be connected to a plastic bag, comprising the steps of molding at least a pair of substantially identical handles each provided with respective male and female interlockable fastener means in first and second molding cavities respectively, the molding cavities being in spaced apart face-to-face relationship and while the molding cavities are closed by intervening reciprocatory plates, and while a plurality of spaced means to shape the interlockable male and female fastener means is extending through the first molding cavity, between opposing ends of said plates and is terminated substantially at the second molding cavity, each last-named means to shape having an end cavity formed to shape the male fastener means and being in communication with the second molding cavity and also having an annular recess formed to shape the female fastener means and being in communication with the first molding cavity, the axes of said means to shape being parallel and being across a plane common to the reciprocatory plates and the first and second molding cavities, said molding of the handles consisting of injecting plastic material into said first and second molding cavities and curing the injected plastic material therein, opening the first and second spaced apart molding cavities by separating the opposing ends of the intervening reciprocatory plates, stripping the handle having the male fastener means out of the second molding cavity by withdrawal of all of the spaced means to shape and thereby moving such handle toward the facing handle remaining in the first molding cavity and causing snap interlocking of the male and female fastener means of the two handles with the latter in face-to-face contact, and separating the means to shape from the two united handles.

2. A method for automatically molding as defined in claim 18, and said separating comprising further withdrawal of the means to shape while simultaneously stripping the united handles from said means to shape.

3. A method of molding, assembling and expelling plastic bag handles from a handle molding apparatus having spaced apart face-to-face handle molding cavities intervened by opposing reciprocatory molding cavity closure plates and coacting means to shape interlockable male and female fastener means on the handles being molded and extending across the closure plates and between the opposing ends thereof and having male and female fastener elements molding recesses in communication with said molding cavities, said method comprising the steps of injecting plastic material into the handle molding cavities and into said molding recesses while said closure plates are in closing relationship to said molding cavities, separating the closure plates following the curing of the injected plastic material to thereby uncover the molding cavities, withdrawing said coacting means to separate the molded handle having the molded male fastener means from its molding cavity and transporting such handle into face-to-face contact with the handle having the female fastener means while the latter handle is remaining in its molding cavity and thereby effecting interlocking of the male and female fastener means, and stripping the handle having the female fastener means from its molding cavity while simultaneously stripping the handle having the male fastener means from said coacting means, whereby the two handles are united in assembled relationship.

* * * * *